(12) United States Patent
Koppelaar et al.

(10) Patent No.: US 12,287,391 B2
(45) Date of Patent: Apr. 29, 2025

(54) METHOD AND APPARATUS FOR DETERMINATION OF DIRECTION OF ARRIVAL ANGLE

(71) Applicant: NXP B.V., Eindhoven (NL)

(72) Inventors: Arie Geert Cornelis Koppelaar, Giessen (NL); Marco Jan Gerrit Bekooij, Empel (NL); Francesco Laghezza, Eindhoven (NL); Feike Guus Jansen, Eindhoven (NL); Yiting Lu, Delft (NL)

(73) Assignee: NXP B.V., Eindhoven (NL)

( * ) Notice: Subject to any disclaimer, the term of this patent is extended or adjusted under 35 U.S.C. 154(b) by 343 days.

(21) Appl. No.: 17/818,016

(22) Filed: Aug. 8, 2022

(65) Prior Publication Data

US 2023/0152435 A1    May 18, 2023

(30) Foreign Application Priority Data

Aug. 20, 2021  (EP) ..................... 21192349

(51) Int. Cl.
*G01S 13/34* (2006.01)
*G06F 1/03* (2006.01)
*G06F 17/15* (2006.01)

(52) U.S. Cl.
CPC ............ *G01S 13/34* (2013.01); *G06F 1/03* (2013.01); *G06F 17/156* (2013.01)

(58) Field of Classification Search
CPC .......... G01S 13/34; G06F 1/03; G06F 17/156
See application file for complete search history.

(56) References Cited

U.S. PATENT DOCUMENTS 10,768,291 B2 * 9/2020 Hammes ............... G01S 13/343
2018/0329709 A1 * 11/2018 Meinl ................ G06F 9/30036

FOREIGN PATENT DOCUMENTS

DE    102012105582 A1 *  1/2013  ............. G01S 13/28
JP    2022182347 A    * 12/2022  ........... G01S 13/426

OTHER PUBLICATIONS

Hacker, P., "Single snapshot DOA estimation", Advances in Radio Science, vol. 8, 2010, pp. 251-256, Oct. 2010.

(Continued)

*Primary Examiner* — Vladimir Magloire
*Assistant Examiner* — Maxine McKenzie Phillips (57) ABSTRACT

An apparatus configured to receive an input dataset, $\underline{x}$, indicative of radar signals reflected from targets as received at a plurality of antenna elements; define a matrix, A, formed of direction-of-arrival-angle vectors, $\underline{a}_n$, each direction-of-arrival-angle vector representing an expected response at the plurality of antenna elements of radar signals from one of the targets; define a signal amplitude vector $\underline{s}$ to represent expected complex amplitudes as received in the radar signals; define an objective function based on $\underline{x}$, A and $\underline{s}$; search for a set of direction of arrival angles for each of the plurality of targets by the repeated evaluation of the objective function for a plurality of candidate matrices based on matrix A; and wherein said search space comprises a plurality of discrete points, z, associated with the direction of arrival angles by a function of $\sin(\theta_k)$.

19 Claims, 3 Drawing Sheets

(56) References Cited

OTHER PUBLICATIONS

Heidenreich, P., "Antenna Array Processing: Autocalibration and Fast High-Resolution Methods for Automotive Radar", Jun. 27, 2012.

Meinl, F., "Hardware Acceleration of Maximum-Likelihood Angle Estimation for Automotive MIMO Radars", 2016 Conference on Design and Architectures for Signal and Image Processing (DASIP), Oct. 12-14, 2016.

Sim, Heonkyo et al., "Improved DOA estimation method by distinction of different transit signals in automotive MIMO frequency-modulated continuous wave radar systems", IET Radar, Sonar & Navigation, Aug. 1, 2020, pp. 1135-1142, vol. 14, No. 8, the Institution of Engineering and Technology, Stevenage, UK.

Krim, Hamid et al., "Two Decades of Array Signal Processing Research: The Parametric Approach", IEEE Signal Processing Magazine, Jul. 1, 1996, pp. 67-94, vol. 13, No. 4, IEEE, Piscataway, NJ, USA.

\* cited by examiner

METHOD AND APPARATUS FOR DETERMINATION OF DIRECTION OF ARRIVAL ANGLE

CROSS-REFERENCE TO RELATED APPLICATIONS

This application claims the priority under 35 U.S.C. § 119 of European Patent application no. 21192349.5, filed on 20 Aug. 2021, the contents of which are incorporated by reference herein.

FIELD

The present disclosure relates to an apparatus and method for determining the directions of arrival angles for each of a plurality of targets in a dataset indicative of radar signals received at an antenna array. The disclosure also relates to a frequency-modulated-continuous-wave, FMCW, radar system configured to perform said method.

BACKGROUND

Deterministic Maximum-Likelihood (DML) Direction-of-Arrival (DoA) estimation is a technique for determination of the directions of arrival angles of component radar signals reflected from each of a plurality of targets in radar signals received at a plurality of antenna elements. The antenna elements may be part of a FMCW radar.

SUMMARY

According to a first aspect of the present disclosure there is provided An apparatus comprising a processor configured to:
receive an input dataset, $\underline{x}$, indicative of radar signals received at a plurality of antenna elements wherein the radar signals have reflected from a plurality of targets;
define a matrix, A, formed of direction-of-arrival-angle vectors, an, comprising one for each one of the plurality of targets, each direction-of-arrival-angle vector representing an expected response at the plurality of antenna elements of radar signals from the target with a predetermined amplitude and comprising a function of a direction of arrival angle relative to the plurality of antenna elements;
define a signal amplitude vector $\underline{s}$ to represent expected complex amplitudes of each of the plurality of targets as received in the radar signals;
define an objective function based on $\underline{x}$, A and $\underline{s}$;
search for a set of direction of arrival angles for each of the plurality of targets by the repeated evaluation of the objective function for a plurality of candidate matrices based on matrix A that each include different direction-of-arrival-angle vectors over a search space, wherein said set of directions of arrival angles are derived from one of the candidate matrices of the plurality of candidate matrices that provides one of a maximum and minimum evaluation of the objective function over the search space; and
wherein said search space comprises a plurality of discrete points, z, associated with the direction of arrival angles by a function comprising $\sin(\theta_k)$, wherein $\theta_k$ represents the direction of arrival angle and wherein the distribution of the direction of arrival angles in the search space is non-uniform.

In one or more examples, the distribution of the points, z, in the search space is uniform.

In one or more examples, $z=\sin(\theta_k)$. In one or more examples, $z=A\cdot\sin(B\cdot\theta_k)$ wherein A and B are constants.

In one or more examples, the apparatus is configured to search for the set of direction of arrival angles in one or both of an azimuth and elevation ranges of angles relative to the plurality of antenna elements.

In one or more embodiments, the number of discrete points, and therefore a plurality of discrete angles of arrival, in the search space comprises a power of two.

In one or more embodiments, the apparatus is configured to, prior to said search for the set of directions of arrival angles, determine a first look up table, said first look up table providing an association between each of the plurality of discrete points of the search space and a function $Y_k$, wherein $Y_k = \underline{a}^H(\theta_k)\,\underline{x}$ and $\underline{a}^H(\theta_k)$ comprises a Hermitian transpose of the direction-of-arrival-angle vector, a, for a candidate direction of arrival angle $\theta_k$ having index k; and
wherein said search comprises a step of retrieving $Y_k$ from the look up table for each of the targets being evaluated for evaluating the objective function that contains the expression, f:

$$f = (A^H\underline{x})^H (A^H A)^{-1} (A^H\underline{x})$$

and $Y_k$ comprises part of the evaluation of the term $(A^H\underline{x})$ of said expression, f.

In one or more embodiments, the apparatus is configured to determine $Y_k$ by performing a correlation comprising calculating an inner product between direction-of-arrival-angle vector, $\underline{a}$, and the input dataset, $\underline{x}$, to obtain a complex value expression, wherein the look up table comprises the evaluation of the complex value expression over the search space.

In one or more embodiments, the apparatus is configured to perform said correlation by Fourier transform.

In one or more embodiments, the number of entries in the input data set, $\underline{x}$, is increased to a predetermined number of entries by adding zero-valued entries, the zero-valued entries added at least at positions in the input dataset relative to the data that is indicative of the radar signals received at the plurality of antenna elements such that the data indicative of the radar signals have positions in the input dataset that correspond to a physical arrangement of the antenna elements and the zero-valued entries have positions in the input dataset that correspond to one or more gaps between the physical arrangement of the antenna elements and, thereby, the number of zero-valued entries between any two consecutive instances of the data indicative of the radar signals represents the inter-antenna element spacing.

In one or more examples, the increase of the number of entries in the input dataset is performed for FFT processing.

In one or more embodiments, the number of discrete points in the search space comprises a power of two.

In one or more embodiments, the apparatus is configured to, prior to said search for the set of directions of arrival angles, determine a second look up table, said second look up table providing an evaluation of $\alpha_{k,n} = (\underline{a}^H(\theta_k)\,\underline{a}(\theta_n))/N$ wherein $\underline{a}^H(\theta_k)$ comprises a Hermitian transpose of the direction-of-arrival-angle vector for candidate direction of arrival angle $\theta_k$, and $\underline{a}(\theta_n)$ comprises the direction-of-arrival-angle vector for a candidate direction of arrival angle $\theta_n$, wherein k represents an index for each of the discrete points of the search space for a first target of the plurality of targets and n represents an index for each of the discrete points of the search space for a second target of the plurality of targets; and wherein said search comprises a step of retrieving $\alpha_{k,n}$ from the look up table for evaluating the objective function that contains the expression, f:

$$f=(A^H\underline{x})^H(A^HA)^{-1}(A^H\underline{x}) \quad \quad 5$$

and wherein the term $(A^HA)^{-1}$ is determined based on:

$$\left(A^HA\right)^{-1} = \frac{1}{N(1-|\alpha_{k,n}|^2)}\begin{pmatrix} 1 & -\alpha_{k,n}^* \\ -\alpha_{k,n} & 1 \end{pmatrix}.$$

In one or more embodiments, the apparatus is configured to determine the second look up table based on the properties $\alpha_{k,n}=(\alpha_{n,k})^*$ and $\alpha_{k,k}=1$, such that the second look up table size for $\alpha_{k,n}$ is $\frac{1}{2}N_\theta(N_\theta-1)$, wherein $N\theta$ designates the number of discrete points, z, in the search space.

In one or more embodiments, the apparatus is configured to determine the values $\alpha_{k,n}$ of the second look up table as a function of indices k and n, the function comprising k-n.

In one or more embodiments, the objective problem is based on Q, wherein $Q=|\underline{x}-A\underline{s}|^2$.

In one or more embodiments, the number of the plurality of targets is between two and five. Thus, the apparatus may be configured to perform the defined process when the number of targets is between two and five. An alternative process may be followed for other values of K targets.

In one or more embodiments, the apparatus includes a Range-Doppler processing module configured to separate antenna data into one or more datasets, each dataset representative of one or more targets and each dataset, relative to others of the one or more datasets, being representative of one or both of:
different ranges from the antenna elements; and
different radial velocities relative to the antenna elements; wherein the antenna data comprises radar signals received at the plurality of antenna elements that have reflected from the plurality of targets, and wherein the input dataset, $\underline{x}$, comprises one of said one or more datasets separated by the Range-Doppler processing module.

In one or more embodiments, the apparatus comprises a frequency-modulated-continuous-wave, FMCW, radar system.

According to a second aspect of the disclosure we disclose a method for determining the directions of arrival angles for each of a plurality of targets K in radar signals comprising:
receiving an input dataset, $\underline{x}$, indicative of radar signals received at a plurality of antenna elements wherein the radar signals have reflected from a plurality of targets;
defining a matrix, A, formed of direction-of-arrival-angle vectors, $\underline{a}_n$, comprising one for each one of the plurality of targets, each direction-of-arrival-angle vector representing an expected response at the antenna elements of radar signals from the target with a predetermined amplitude and comprising a function of the direction of arrival angle relative to the plurality of antenna elements;
defining a signal amplitude vector $\underline{s}$ to represent expected complex amplitudes of each of the plurality of targets as received in the radar signals;
defining an objective function based on $\underline{x}$, A and $\underline{s}$;
searching for a set of directions of arrival angles for each of the plurality of targets by the repeated evaluation of the objective function for a plurality of candidate matrices based on matrix A that each include different direction-of-arrival-angle vectors over a search space, wherein said set of directions of arrival angles are derived from one of the candidate matrices of the plurality of candidate matrices that provides one of a maximum and minimum evaluation of the objective function over the search space; and
wherein said search space comprises a plurality of discrete points, z, associated with the direction of arrival angles by a function comprising $\sin(\theta_k)$, wherein $\theta_k$ represents the direction of arrival angle and wherein the distribution of the direction of arrival angles in the search space is non-uniform.

According to an aspect of the disclosure we provide a computer program product, such as a non-transitory computer program product comprising computer program code which, when executed by a processor of an apparatus causes the apparatus to perform the method of the second aspect.

In one or more examples, the apparatus may comprise at least one processor and at least one memory, wherein the memory stores the computer program and the processor is configured to execute said computer program.

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the spirit and scope of the appended claims are covered as well.

The above discussion is not intended to represent every example embodiment or every implementation within the scope of the current or future Claim sets.

The figures and Detailed Description that follow also exemplify various example embodiments. Various example embodiments may be more completely understood in consideration of the following Detailed Description in connection with the accompanying Drawings.

BRIEF DESCRIPTION OF THE DRAWINGS

One or more embodiments will now be described by way of example only with reference to the accompanying drawings in which.

DETAILED DESCRIPTION

Figure 1:
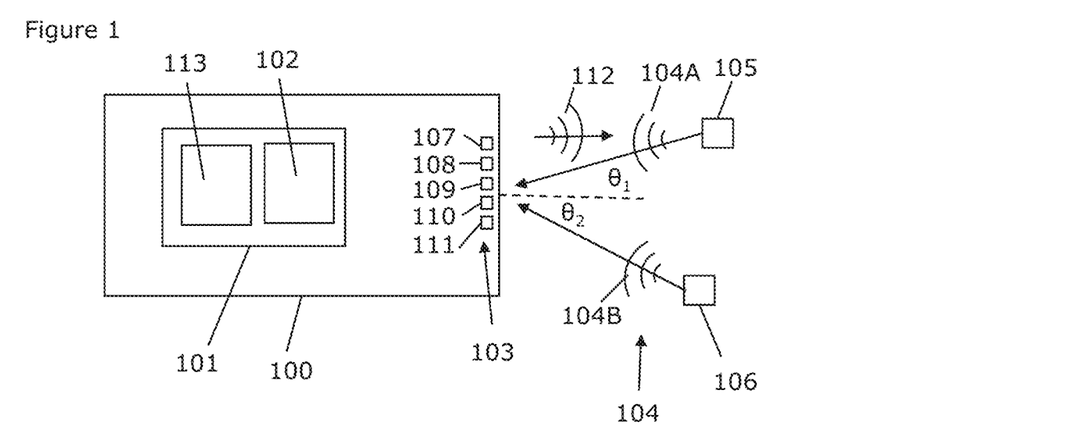
FIG. 1 shows an example embodiment of an apparatus and a FMCW system.

FIG. 1 shows an example embodiment of a FMCW system 100. The system comprises an apparatus 101, which may comprise a processor 102, for processing data indicative of radar signals 104 received by an antenna array 103. The radar signals 104 may comprise reflections from one or a plurality of targets 105, 106.

The antenna array 103 comprises a plurality of antenna elements 107-111. One or more of the antenna elements may be configured to transmit radar signals, which may comprise a FMCW chirp 112, that will reflect from the targets 105, 106. Two or more of the antenna elements 107-111 may be configured to receive the reflected radar signals 104A, 104B from the targets 105, 106.

FMCW radar has many applications and may be used in the automotive field to detect targets in the neighbourhood of the vehicle with the objective to make driving safer and more comfortable. Distance to the target(s) 105, 106 and the relative velocity of the target(s) can be estimated. The use of several antenna elements 107-111 to transmit and receive radar signals allows for the direction in which this target is present to be determined and it is typically represented as an angle relative to a direction of the antenna elements.

The reflected radar signal 104A from the first target 105 has a direction of arrival angle of $\theta_1$ at the antenna elements 107-111. The reflected radar signal 104B from the second target 106 has a direction of arrival angle $\theta_2$ at the antenna elements 107-111. However, the radar signals 104 as received by the antenna elements 107-111 comprises a combination of the signals 104A and 104B and noise. It will also be appreciated that the direction of arrival angle may represents the angle of arrival of the reflected radar signals 104A, 104B in one or both of an azimuth angle and an elevation angle.

Accordingly, it is necessary to processes the received radar signals to determine, optionally, the number of targets (if not known or otherwise determined) and the direction of arrival angles $\theta_k$, which in this example comprise $\theta_1$ and $\theta_2$.

Deterministic Maximum-Likelihood (DML) Direction-of-Arrival (DoA) estimation is a known process for determining the most likely (including likely) angles from which the radar signals 104A, 104B are received to create the observed combination of radar signals 104 as received by the antenna elements 107-111.

The transmitted radar signals are reflected by the target(s) 105, 106 and received by the receive antenna elements of the radar system 100 and, depending on the direction of arrival angle of the reflected wave(s) $\theta_1$ and $\theta_2$, different path-lengths between transmit antenna element, targets 105, 106 and receive antenna elements are realised, leading to phase differences in the received radar signals between the antenna elements. Analysis of these phase differences is carried out to estimate the direction of arrival angle of the target(s).

Direction of arrival angle estimation based on data from the antenna array 103 is an important matter for radar systems 100. If the radar signals received originate from one target 105, the signal strength at the antenna elements 107-111 is identical but due to path length differences between antenna elements 107-111 and target 105 the phase of the radar signal will be different and is a function of the direction of arrival angle.

Figure 2:
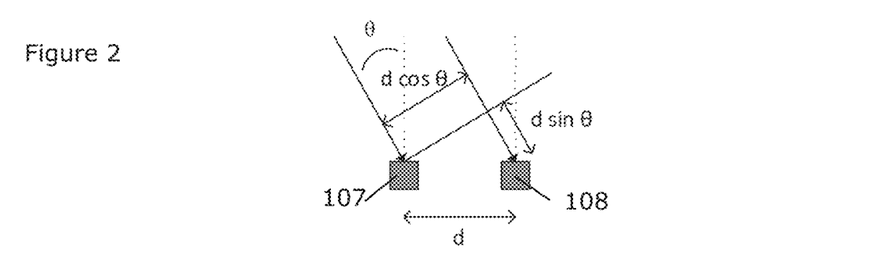
FIG. 2 shows an example embodiment of a pair of antenna elements illustrating a direction of arrival angle.

FIG. 2 shows two example antenna elements, which may comprise antenna elements 107 and 108 receiving the radar signal 104A. The path length difference is given by d sin θ where d is the antenna element spacing and θ is the direction-of-arrival angle.

When multiple targets 105, 106 are reflecting, a linear combination of these signals will be received. Because of the linear combination, both the amplitude and the phase per antenna element 107-111 will vary and has to be used to estimate the DoA angles of the targets 105, 106.

In practice the number of targets 105, 106 is unknown and has to be estimated as well. In one or more examples, data from the antenna array 103 can be pre-processed to analyse the space in which the targets are located.

Using radar signals, such as FMCW radar signals, one can use the known technique of Range-Doppler processing to quantize the received signal in Range and Doppler shift. For each Range-Doppler combination for which one has detected energy (above a threshold), one can carry out the DoA estimation. The Range-Doppler pre-processing separates targets on the basis of their distance from the antenna array 103 and their velocity (Doppler) and therefore the number of targets per Range-Doppler bin are expected to be low. The properties of the FMCW signal determine how fine the radar scene is quantized in Range and Doppler. With an appropriate designed radar system it is reasonable to assume that having one target present in the radar data of one Range-Doppler bin is more likely than having two present in the radar data of one Range-Doppler bin, and 2 targets more likely than 3 targets etc. In one or more examples, therefore, an algorithm to solve the DoA problem may therefore start with searching first for only one target, then for two targets, then for three targets, etc. When each of these searches indicates how well the found candidate DoA's match with the received radar data signals then one can stop searching for more targets if the match with the received signal is sufficiently close (e.g. above a threshold level of confidence). Noise in the radar system is a reason why an exact match is unlikely to happen. Since noise power is estimated in radar systems, a threshold may be derived to evaluate the match.

Deterministic Maximum Likelihood DoA estimation is a technique that for a given number of targets can determine what the most likely DoA angles are and what their match is to the received radar signal. In one or more examples, the DML algorithm may be configured to find the DoA angles that maximizes the match with the received radar data. In case a K-target search with DML finds a match that is too poor (e.g. below a threshold level of a match) on the basis of the known noise properties, then one proceeds with a (K+1)-target search with DML. A DML search for (K+1) targets is more complex than a search for K targets. Therefore, in a practical implementation one has to stop after a certain K because of limitations in computing resources to search for more targets. Moreover, system imperfections (amplitude and phase distortions, noise) also limits the number of targets one successfully can estimate. In one or more examples a practical value for K is therefore from 1 to 2 or 1 to 3 or 1 to 4 or 1 to 5 potential targets.

DoA estimation may be carried out for each Range-Doppler bin for which sufficient energy is detected. In a rich radar scene this means that DoA estimation may have to be carried out many times within a system cycle. For that reason it is important that the corresponding complexity of the DoA estimation process is low.

DoA estimation starts with the radar signals received at the antenna elements or, more particularly, the data representing the reflected radar signals received at the antenna elements 107-111. These signals can be represented collectively with an N-dimensional vector $\underline{x}=(x_1, \ldots, x_N)^T$, which is often called a snapshot, and wherein T stands for transpose, such that $\underline{x}$ is a column vector. The number of antenna elements is N. During a system cycle, radar signals received by the apparatus 101 may comprise data representative of the received signals at each of the antenna elements 107-111. In one or more examples, during a system cycle, radar signals received by the apparatus may comprise snapshots extracted from one or more Range-Doppler bins. In one or more examples, DoA estimation may be carried out only for those Range-Doppler bins that contain radar signals having an energy above a certain threshold. Thus, the following process can be performed on the data whether or not Range-Doppler processing has been performed.

A signal received from a target at DoA angle $\theta_1$ will result in a response at the antenna elements 107-111. That response has constant amplitude and a phase relation between the antenna elements that is specific for the DoA angle $\theta_1$ and the relative positions of the antenna elements 107-111. The response can be denoted with a vector: $\underline{a}_1 = \underline{a}(\theta_1)$. When at least two antenna elements have a distance $\leq \lambda/2$, and the DoA angle $\theta$ may be between $-90$ and $90$ degrees, any two single target responses will be different and therefore the DoA angle of a single target response can be unambiguously determined. For multiple, say K targets, the antenna response will be a linear combination of K single target responses, i.e.

$$\underline{x} = \Sigma_{k=1}^{K} s_k \underline{a}_k + \underline{n},$$

where $\underline{n}$ represents additive noise, and $s_k$ represent the complex amplitude of the targets and $\underline{x}$ represents an input dataset representing the radar signals received at the antenna elements 107-111, and $\underline{a}_k$ comprises a vector and comprises a function of the DoA, wherein $$\underline{a}_n^T = (e^{j2\pi(d_1/\lambda)\sin\theta_n}, e^{j2\pi(d_2/\lambda)\sin\theta_n}, \ldots, e^{j2\pi(d_N/\lambda)\sin\theta_n})$$

and $(d_1, \ldots, d_N)$ are the relative positions of the antenna elements or virtual antenna elements. The vector $\underline{a}_n$ carries the relative phase behaviour among the antenna elements due to pathlength difference of a planar wave originating from an angle $\theta_n$.

Figure 3:
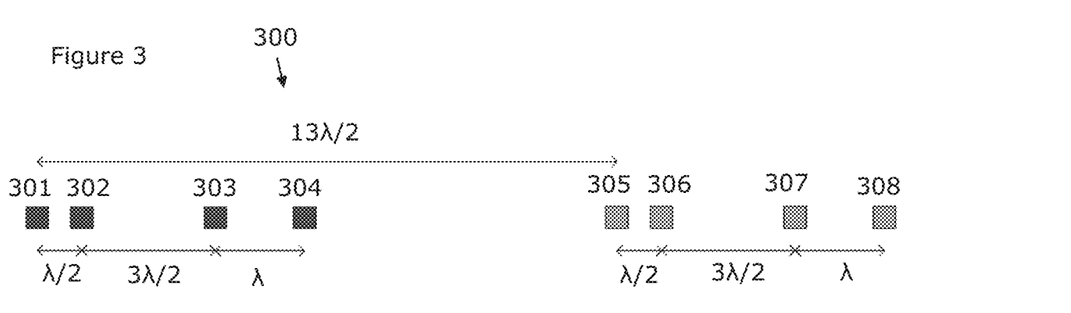
FIG. 3 shows an example embodiment of a plurality of antenna elements, wherein the antenna elements may be true antenna elements or virtual antenna elements or a combination.

FIG. 3 shows an example antenna array 300 with antenna elements 301-308 separated by distances d of different fractions of the operating wavelength. For example, the antenna array 300 may be configured to operate according to a MIMO scheme for which the positions of the two virtual antenna elements 301, 305 are indicative of the positions of the transmitters and are separated by 13 $\lambda/2$, and the virtual antenna elements 301, 302, 303, 303 are indicative of the receive array with antenna spacing $(0, 1, 4, 6)\lambda/2$, that in this specific example forms a Minimum Redundancy Array. Together they form a virtual antenna array with relative element positions $(d_1, \ldots, d_8) = (0, 1, 4, 6, 13, 14, 17, 19)\lambda/2$. Thus, in one or more examples, the antenna array 300 may comprise a combination of true and virtual antenna elements depending on the configuration of the antenna array. In other examples, the antenna array 300 may comprise all true antenna elements, i.e. the scenario in which the radar system will use one transmitter 301 antenna and eight receive antennas 301-308. Thus, the term antenna element can refer to true (real) antenna elements as well as virtual antenna elements.

The processing performed by the apparatus is based on the aforementioned input dataset. The input dataset may be from a Range-Doppler bin if the optional Range-Doppler processing is performed.

A more formal way to describe the linear combination of K single target responses is: $\underline{x} = A\underline{s} + \underline{n}$, where s collectively contains the K complex amplitudes $s_k$ of the targets and the matrix A contains the K single target responses $\underline{a}_k$, for $k = 1, \ldots, K$.

For Additive White Gaussian Noise (AWGN), the K-target DML estimation can be summarized for finding the value of s and the matrix A that minimizes:

$$Q = |\underline{x} - A\underline{s}|^2$$

The value for s and the matrix A that minimizes Q, are called the maximum likelihood (ML) solutions. For the DoA estimation problem, $\underline{s}$ is a side-product and the matrix A is the main output because its columns $\underline{a}$ can be uniquely linked to DoA angles $\theta$.

A general description of DML-DoA determination will be provided followed by embodiments of the processing the example embodiment apparatus 100 is configured to perform.

Instead of jointly searching for the most likely $\underline{s}$ and the matrix A, an intermediate step may be carried out such that the search can be confined to the search for the most likely matrix A.

To simplify the search, it can be assumed that if one knows what the matrix A is, then given A and antenna response x then one can determine which value of s minimizes $Q = |\underline{x} - A\underline{s}|^2$. This is a mean-square error problem and its least square solution is given by $\hat{\underline{s}} = (A^H A)^{-1} A^H \underline{x}$, where superscript H means complex conjugate transpose. The matrix $(A^H A)^{-1} A^H$ is also known as the pseudoinverse or Moore-Penrose inverse and is then denoted by $A^+$. To complete the simplification, the solution is substituted back into the expression for Q:

$$Q = \underline{x}^H (I - A(A^H A)^{-1} A^H) \underline{x} = \underline{x}^H \underline{x} - \underline{x}^H (A(A^H A)^{-1} A^H) \underline{x}.$$

Hence, the K-target DML problem becomes the problem of finding the K-column matrix A that minimizes Q. The term $\underline{x}^H \underline{x}$ in the expression for Q stays constant for a given received antenna response, that is the input dataset $\underline{x}$ and can therefore be omitted in the search for the most likely matrix A.

Instead of minimizing Q, one can equivalently perform a search with the aim of maximizing f, wherein:

$$f = \underline{x}^H (A(A^H A)^{-1} A^H) \underline{x}.$$

f is termed the objective function of the search for A.

f as a function of A for a given antenna response $\underline{x}$ has many local maxima. The search for the most likely matrix A, i.e. the one that maximizes f, may or may not be performed exhaustively.

Another practical point of attention is that the DoA angles that lead to the formation of matrix A can have any value between $-90$ and $90$ degrees. To limit the search space, the DoA search space may be quantized into $N\theta$ discrete points in the range $<-90, 90>$ degrees. Hence per target we consider $N_\theta$ DoA angles.

A further simplification to the search may be performed. In particular, to further reduce the search space one has to realize that the function f is symmetric, i.e. for K=2 targets, the evaluation of the DML objective function f with $A = [\underline{a}(\theta_1) \ \underline{a}(\theta_2)]$ provides the same result as using $A = [\underline{a}(\theta_2) \ \underline{a}(\theta_1)]$. Therefore, one can reduce the search space for K=2, with roughly a factor 2 without sacrificing the finding of the maximum. In general, for K targets, the search space can be limited to size $$N_K = \binom{N_\theta}{K}.$$

As an example, for $N_\theta = 256$ and a search for K=2 targets, the search space has an approximate size of $2^{15} = 32768$. Hence, the DML objective function f has to be evaluated $N_K$ times in order to find the K DoA angles that maximizes f.

As an example of a general DML algorithm, we provide the following summary:

```
for n = 1:N_K,
    select θ_1, θ_2, ..., θ_K from DoA search space
    form matrix A = (a(θ_1) a(θ_2) ... a(θ_K)], matrix has K columns and
    N rows
    Calculate A^H A, where H means complex conjugate transpose
    (Hermitian). The result is a KxK matrix
    Determine B = (A^H A)^-1, i.e. the inverse of A^H A
    Premultiply B with A and postmultiply with A^H:
        ABA^H = A (A^H A)^-1 A^H, this is an NxN matrix
    Use the antenna response input dataset x to calculate f =
    x^H (A(A^H A)^-1 A^H) x
    During search keep track of maximum f so far and the
    corresponding DoA angles
End
```

The general DML algorithm suffers from a lot of intensive matrix operations per evaluation of the DML objective function for each point in the search space. Thus, with the DML process formulated as matrix algebra and with the use of a reasonably dense search space, it is clear that the process is computationally intensive.

In the summary above, the K-dimensional search is represented as a linear search. It will apparent to those skilled in the art that the K-dimensional search can also be represented as K nested for-loops. The matrix operations that makes DML computationally intensive would be carried out in the inner for-loop. The search space associated with the K nested for-loops has the same size as the linear search shown in the summary above, i.e. the search space has size $N_K$. In one or more examples, the complexity of the inner loop of the algorithm can be reduced if one confines to K=2 targets.

In one or more examples, the following known method may be performed to reduce the number of matrix operations in the inner loop. In this example, the same objective function f is calculated for all points in the direction-of-arrival search space, but the calculations are organized in a different way.

Firstly, it is observed that the DML objective function without loss of generality can be rewritten as $f=(\underline{x}^H A)(A^H A)^{-1}(A^H \underline{x})=(A^H \underline{x})^H (A^H A)^{-1}(A^H \underline{x})$.

Secondly it is observed that the $A^H \underline{x}$ is the correlation of the antenna response input dataset $\underline{x}$ with the complex conjugate of K single target responses, i.e. $A^H \underline{x}=(\underline{a}^H (\theta_1)\underline{x}, \underline{a}^H(\theta_2)\underline{x}, \ldots, \underline{a}^H(\theta_K)\underline{x})^T$.

Thirdly, for K=2, the matrix $B=(A^H A)^{-1}$ can be calculated symbolically such that no matrix inversion has to be carried out in the inner loop. With $A=[\underline{a}(\theta_k) \ \underline{a}(\theta_n)]$ one obtains $$B = (A^H A)^{-1} = \frac{1}{N(1-|\alpha_{k,n}|^2)}\begin{pmatrix} 1 & -\alpha_{k,n}^* \\ -\alpha_{k,n} & 1 \end{pmatrix}$$

where $$\alpha_{k,n} = \frac{1}{N}(\underline{a}^H(\theta_k)\underline{a}(\theta_n)).$$

Note this is an in-product between 2 single target responses and results in complex scalar. Combining all aforementioned steps, one can summarize the general DML method as follows:

```
For k = 1:N_θ
    Select θ_k, form a(θ_k)
    For n = k + 1:N_θ,
        Select θ_n, form a(θ_n)
        Calculate a_{k,n} = (a^H(θ_k) a(θ_n))/N
        Calculate Y_k = a^H(θ_k) x and Y_n = a^H(θ_n) x
        Substitute the values for a_{k,n}, Y_k and Y_n in the expression for
        the DML objective function.
```

$$f = \frac{1}{N(1-|\alpha_{k,n}|^2)}(|Y_k|^2 - 2\text{Re}\{\alpha_{k,n} Y_k Y_n^*\} + |Y_n|^2),$$

```
        where Re{ } means the real part.
        During search keep track of maximum f sofar and the
        corresponding DoA angles
    End
End
```

It will be appreciated that in this example, the search may be decomposed into two nested for-loops. One for-loop for each of the two DoA angles $\theta_1$ and $\theta_2$ the search is looking to identify.

Embodiments of the processes performed by the apparatus 100 will now be described. It will be appreciated that the method to reduce the number of (or remove) matrix operations in the inner loop may be implemented in the processes described below. It will also be appreciated that the formulation of $\vec{s}$ and the quantization of the search space as described above may also be applied to the processes described below.

In one or more examples, the apparatus is configured to perform the DML DoA method over a search space in which said search space comprises a plurality of discrete direction of arrival angles having non-uniform spacing therebetween and wherein the spacing between the discrete angles of arrival comprises a function of $\sin(\theta_k)$ between −1 and +1 (or a smaller range if the apparatus is configured to operate over a smaller field of view) wherein $\theta_k$ is the direction of arrival angle relative to the plurality of antenna elements. Thus, it will be appreciated that directions of arrival that may be resolved vary between $\theta_k=-90$ and $\theta_k=+90$ degrees. In the vectors a, we may see for the individual vector elements the value $\sin(\theta_k)$ in the exponents. For $\theta_k$ between −90 and +90 degrees, the value $\sin(\theta)$ varies between −1 and +1. Instead of choosing $\theta_k$ uniformly between −90 and +90, the apparatus may be configured to select a discretized search space $z_k$ uniformly between −1 and +1. Corresponding $\theta_k$ can be determined using $\theta_k=\arcsin(z_k)$. Thus, $\theta_k$ has a relation with $z_k$ in that $\theta_k=\arcsin(z_k)$ wherein $z_k$ may be uniformly distributed, but this means that $\theta_k$ is non-uniformly distributed.

Thus, to summarise, the apparatus 101 comprising the processor 102 is configured to receive an input dataset, $\underline{x}$, indicative of radar signals, $x_1, \ldots, x_N$, received at a plurality of (real and/or virtual) antenna elements 107-111, 301-308, N, wherein the radar signals have reflected from a plurality of targets, namely K=2 targets 105, 106 in the example of FIG. 1. The input dataset may comprise a snapshot from a Range-Doppler bin after Range-Doppler processing has been performed. Otherwise the input dataset may be indicative of the radar signal received at the plurality of antenna elements 107-111, 301-308 without Range-Doppler processing. Thus, in one or more examples, the radar signals $x_1, \ldots, x_N$ represent signals from N (i.e. virtual) antenna elements after Range Doppler processing. One such signal, say $x_n$, may be a complex value, wherein its amplitude $|x_n|$ may represent the energy of the radar signal by means of energy being linear with $|x_n|^2$. In one or more examples, Range-Doppler processing is done once per system cycle, hence the energy associated with $x_n$ may be the average for one system cycle and specific for one range, one Doppler value and one virtual antenna element. In one or more examples, only for those Range-Doppler values (the radar signals of the input dataset) for which sufficient energy is detected at the N antennas, the DoA estimation method described below is applied. It will be appreciated that "sufficient energy" may comprise a comparison to a threshold value. The threshold value may be set based on an assessment of noise in the radar signals.

The processor 102 is configured to define a matrix, A, formed of K vectors, an, comprising one for each one of the plurality of targets 105, 106, each vector a representing an expected response of the target represented by the vector with a predetermined amplitude and comprising a function of the direction of arrival angle relative to the plurality of antenna elements. Thus, it will be appreciated that the expected response may be considered the ideal response of a target at direction of arrival angle theta without noise, wherein such an ideal response is represented with unit-amplitude, and the direction of arrival information is contained in the phase. Thus, in practice, the true response of a target at direction of arrival angle theta will be scaled version of the vector $\underline{a}$ and will be corrupted by additive noise. It will be appreciated that the number (K) of vectors a may be known by way of predetermined information. In other examples, K may initially be assumed to be one, then two and so on up to a predetermined maximum number and a search for the vectors an may be performed for each assumed K. As mentioned above, each of the vectors $\underline{a}_n$ may be represented as follows, wherein the transpose of $\underline{a}_n$ is given by:

$\underline{a}_n^R = (ee^{j2\pi(d_1/\lambda)\sin\theta_n}, ee^{j2\pi(d_2/\lambda)\sin\theta_n}, \ldots, e^{j2\pi(d_N/\lambda)\sin\theta_n})$ wherein $d_1, d_2 \ldots d_N$ represents the relative positions of the antenna elements 107-111, 301-308 from a reference point. Thus, for example, the distance between a $1^{st}$ and $2^{nd}$ antenna element is $d_2-d_1$.

The processor 102 is configured to define a signal amplitude vector s to represent expected complex amplitudes of each of the K targets as received in the radar signals. In one or more examples, the processor 102 is configured to define a noise vector representing noise present at the plurality of antenna that receive the radar signals. It will be appreciated that the definition of the noise vector is based on an assumption that we can model the system as having additive noise. The noise represented by the noise vector may be assumed to comprise Additive White Gaussian Noise.

The processor 102 is configured to define an objective function based on $\underline{x}$, A and $\underline{s}$. As mentioned above the objective function may comprise:

$Q = |x-A\underline{s}|^2$, which can be expressed in a variety of ways, including the substitution of $\underline{s}$ as defined above, which is an estimate of the signal source vector $\underline{s}$.

The processor 102 is configured to search for a set of directions of arrival angles, one for each of the K targets, by the repeated evaluation of the objective function for a candidate matrix A that include vectors that represent directions of arrival angles from the search space, wherein said set of directions of arrival are derived from the candidate matrix A that provides a minimum evaluation of the objective function over the search space. It will be appreciated that a minimum evaluation of the objective function may be determined by a maximum evaluation of the objective function should it be expressed differently, although both achieve the same aim of finding a matrix A that sufficiently matches the input dataset x by virtue of the evaluation of the objective function reaching a minimum or maximum (depending on how it is expressed) or a value beyond a predetermined threshold. The definition of the search space determines which candidate values in the matrix A are evaluated in the search.

It has been found that evaluating the objective function as part of the search over a search space that comprises a plurality of discrete angles of arrival having non-uniform spacing therebetween and wherein the spacing between the discrete angles of arrival comprises a function of $\sin(\theta_k)$ can, in one or more examples, be advantageous in terms of the angular resolution of scene from which the reflected radar signals are received. Thus, the angular spacing of the points in the search space, $\theta_k$, will be non-uniform, wherein $\theta_k = \arcsin(z)$, wherein z represents the discrete points of the search space.

To explain further, the angular resolution of a planar antenna array 103, 300 is non-uniform, wherein for targets right in front of the antenna array (broadside) the resolution is higher, while for targets at larger (positive or negative) angles the resolution is smaller. Therefore it is beneficial to use a non-uniform search space searching for the DoAs. A non-uniform grid may requires less discrete points without sacrificing resolution. In one or more examples, this may allow for Nθ, the number of discrete points in the search space, to be chosen smaller than with a uniform search space. In one or more examples, the choice of a search space where the discrete points in the search space are related to the angles of arrival by a function of $\sin(\theta_k)$ has additional advantages in terms of the processing performed by the processor 102. A side-effect of choosing spacing $z_k = \sin(\theta_k)$ uniform between −1 and 1, is that the corresponding grid in terms of $\theta_k$ will be denser for small $|\theta_k|$ and coarser at large $|\theta_k|$. However, since the effective aperture of an array is linear with cos(e) (See FIG. 2), the non-uniform sampling of the search space is complementary aligned with the effective aperture.

To explain the advantages of the selection of the search space, some extra observations will be explained in order to appreciate why the processing advantages occur.

First of all, the calculation of $Y_k = \underline{a}^H(\theta_k)\underline{x}$ and $Y_n = \underline{a}^H(\theta_n)\underline{x}$ is essentially the "beam-forming" correlation result at angles $\theta_k$ and $\theta_n$. Therefore, $|Y_k|^2$ and $|Y_n|^2$ are equal to the values of the "beam-forming" spectrum evaluated at angles $\theta_k$ and $\theta_n$. The next observation is that the value $\alpha_{k,n} = (\underline{a}^H(\theta_k)\underline{a}(\theta_n))/N$ is an inner product (or dot product) between two ideal single target responses. Therefore, the DML objective function can be regarded as the sum of single target beam-forming spectra values that are corrected with a value that represents mutual influence of single target responses at the total antenna array response. E.g. when $\alpha_{k,n}=0$, the single target responses are orthogonal and the DML objective function simply becomes $$f = \frac{1}{N}(|Y_k|^2 + |Y_n|^2).$$

Also for K>2 targets, the evaluation of the DML objective function can be written as a part in which the contribution of K targets is accounted for independently and a second part in which the mutual influence of the K targets is accounted for. This mutual influence is then still described by the same $\alpha_{k,n}$. For example, for three targets k, m, n we have mutual influence $\alpha_{k,m}$, $\alpha_{k,n}$ and $\alpha_{m,n}$.

In the general DML method described above, the values $Y_k$, $Y_n$ and $\alpha_{k,n}$ are calculated in the search step and, in particular, in the inner loop thereof. The first computational reduction that can be achieved is to calculate these values, store them in a Look-up Table (LUT) and to fetch these values in the search step, such as in an inner loop thereof from the LUT for substitution in the DML objective function.

Since, the search for the DoAs is carried out over the discrete DoA search space, which can be considered to comprise a grid of size Nθ, the LUT for $Y_k$ has size $N_\theta$ and the one for $\alpha_{k,n}$ has a gross size of $N_\theta^2$. Using the properties $\alpha_{k,n}=(\alpha_{n,k})^*$ and $\alpha_{k,k}=1$, the table size for $\alpha_{k,n}$ can be reduced to $\frac{1}{2}N_\theta(N_\theta-1)$.

In one or more examples, the number of the plurality of discrete angles of arrival in the search space comprises a power of two. Thus, $N_\theta$ is a power of 2 and may, in one or more examples, comprise 256 or at least 256.

With the search space defined such that the spacing between the discrete points in relation to the angles of arrival comprises a function of $\sin(\theta_k)$, the following advantages may, in one or more examples, be realised:
1. the values $Y_k$ may, in one or more examples, be calculated by correlation using a Fast Fourier Transform (FFT) or a Discrete Fourier transform and
2. the values $\alpha_{k,n}$, may in one or more examples, be expressed as a function of (k−n), and hence provide for generation of a LUT for $\alpha_{k,n}$ that will have size $N_\theta$.

In one or more examples, the apparatus 101 is configured to, prior to said search for the set of directions of arrival angles, determine a first look up table, said look up table providing an association between each of the points in the search space (which relate to the plurality of discrete DoA angles) of the search space and a function $Y_k$, wherein $Y_k = \underline{a}^H(\theta_k)\,\underline{x}$ and $\underline{a}^H(\theta_k)$ comprises a Hermitian transpose of the vector a for target k for a candidate direction of arrival angle θk; and
wherein said search comprises a step of retrieving one or more $Y_k$ values from the look up table for each of the targets being evaluated for evaluating an objective function that contains the expression:

$$f=(A^H\underline{x})^H(A^HA)^{-1}(A^H\underline{x})$$

and $Y_k$ comprises part of the evaluation of the term $(A^H\underline{x})$ of said objective function, f.

Thus, as an example, in a two target evaluation, K=2, the apparatus 100 is configured to retrieve two values from the first look up table, say for candidate angle $\theta_k$, $Y_k$ is retrieved and for the other candidate angle $\theta_n$, $Y_n$ is retrieved (i.e. two candidates angles are jointly evaluated in expression, f, comprising one candidate angle for the $1^{st}$ target and one candidate angle for the $2^{nd}$ target. Thus, $(Y_k, Y_n)^T$ comprises the evaluation of the term $(A^H\underline{x})$. Hence it can be considered that $Y_k$ comprises part of the evaluation of $(A^H\underline{x})$, and $Y_n$ the other part of the evaluation of $(A^H\underline{x})$.

The first look up table thus provides an evaluation of the function $Y_k$ for each Direction of Arrival angle θ associated with the search space. To summarize, in the search step for the best DoA angle, for each target we consider $N_\theta$ possible values for the DoA angle. For each of the $N_\theta$ DoA angles, one can determine a vector a that represents the ideal (or normalized noise-less) response for a single target from that DoA angle. The evaluation of the DML objective function requires (among more calculations) the evaluation of $(A^H\underline{x})$, where A is constructed from K of these ideal responses. The calculation of $(A^H\underline{x})$, for a given radar signal x, can be determined for each of the $N_\theta$ candidate DoA angles. The $N_\theta$ calculations thus comprise the first look up table and, for example, the look up table will contain $N_\theta$ complex values, one complex value per candidate DoA angle.

In one or more examples, the first look up table also includes an evaluation of $|Y_k|^2$ for each point in the search space.

In one or more examples, the apparatus 100 is configured to determine $Y_k$ by performing a correlation comprising calculating an inner product between direction-of-arrival-angle vector a and the input dataset $\underline{x}$ to obtain a complex value expression, wherein the look up table comprises the evaluation of the complex value expression over the search space, that is for each discrete point in the search space.

In one or more examples, the apparatus 100 is configured to perform said correlation by Fourier transform, such as Fast Fourier Transform, FFT, or Discrete Fourier Transform, DFT.

In one or more examples, the apparatus 100 is configured to perform zero-valued entry insertion of the input dataset. In particular, zero-valued entries may be added to the input dataset, which may comprise a matrix or array, at positions such that the data indicative of the radar signal is spaced apart by the zero-values entries such that their arrangement in the input dataset matrix or array corresponds to the physical arrangement of the antenna elements from which the data is obtained. The zero-valued entry insertion of the input dataset may additionally or alternatively be performed to give the input dataset a desired size for the purposes of Fourier transform processing, which will be described below.

Thus, the apparatus 100 may be configured to insert zero-valued entries into the input dataset, wherein the number of entries (i.e. instances of data from the antenna elements) in the input data set, $\underline{x}$, is increased to a predetermined number of entries by adding zero-valued entries, the zero-valued entries added at positions in the input dataset relative to the data that is indicative of the radar signals received at the plurality of antenna elements such that the data indicative of the radar signals have positions in the input dataset that correspond to a physical arrangement of the antenna elements and the zero-valued entries have positions in the input dataset that correspond to one or more gaps between the physical arrangement of the antenna elements and, thereby, the number of zero-valued entries between any two consecutive instances of the data indicative of the radar signals represents the inter-antenna element spacing.

Figure 4:
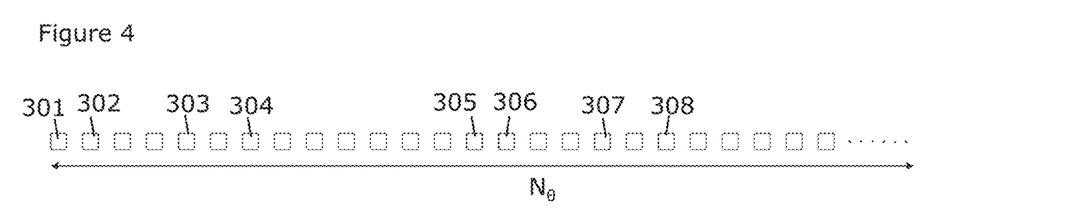
FIG. 4 shows an example embodiment of the same distribution of antenna elements as FIG. 3 but projected on a uniform grid with spacing between the antenna elements of $\lambda/2$.

FIG. 4 shows the same virtual antenna elements (including virtual antenna elements) projected on a uniform grid with antenna element spacings of λ/2. This projection shows how data representative of the radar signals extracted from the (virtual) antenna elements can be inserted in a vector of values that will be analysed using Fourier transform processing, such as FFT.

FIG. 4 also illustrates the generation of an zero-value inserted input dataset that has length $N_\theta$ wherein $N_\theta$ represents the number of discretized points of the search space. The zero-value inserted input dataset is thus derived from the input dataset indicative of the reflected radar signals received at the antenna elements 301-308 and includes said added zero-valued entries. The zero-valued insertion may be needed when we have a non-uniform linear antenna element array, i.e. the virtual antenna elements are at locations that are multiples of λ/2, but not at every multiple of λ/2 a virtual antenna is present as shown in FIG. 4. In example FIG. 4 we have antenna elements at positions {0,1,4,6,13,14,17,19}x λ/2, Hence, there are no antenna elements present at positions {2, 3, 5, 7, 8, 9,10, 11, 12, 15, 16, 18}×λ/2. It is at these positions that the zero-valued entries are inserted.

In one or more examples zero-value insertion may be performed to pad the input dataset to the predetermined number of entries by adding zero-valued entries in the input dataset at positions after the data indicative of the radar signals. Thus, the padding may be performed because we want to evaluate the objective function at $N_\theta$ direction-of-arrival angles. Using FFT for performing a correlation, one can do this efficiently by extending the input dataset (e.g. vector) $\underline{x}$ using zero-valued entries at the locations $\{20,21, \ldots, N_\theta-1\} \times \lambda/2$.

In one or more examples, the predetermined number of entries in the input dataset, including any zero-valued entries, is configured to be substantially equal to the number of discrete points in the search space, $N_\theta$.

The correlation results $Y_k$ can be calculated with a DFT/FFT. In one or more examples, said Fourier transform by FFT or DFT is performed when the following conditions are met:
- the discrete points of the search space (i.e. the grid) for which the correlation results have to be calculated is uniform in $\sin(\theta)$ and
- the antenna elements have spacings that are multiples of $\lambda/2$ Thus, looking to the vectors $\underline{a}_k$ the apparatus is configured to correlate with: $\underline{a}_k^T = (e^{j2\pi(d_1/\lambda)\sin \theta_k}, e^{j2\pi(d_2/\lambda)\sin \theta_k}, \ldots, e^{j2\pi(d_N/\lambda)\sin \theta_k})$, The $n^{th}$ component of this vector has an argument $\varphi_{k,n} = 2\pi (d_n/\lambda) \sin \theta_k$. As mentioned above, the search space for $\theta_k$ is chosen in such a fashion that the discrete points $z_k = \sin(\theta_k)$ is uniform between up to $-1$ and $1$. We select $N_\theta$ discrete points of the search space and therefore $z_k$ can be written as $$z_k = \frac{2k}{N_\theta} \text{ for } k = -\frac{N_\theta}{2}, \ldots, \frac{N_\theta}{2} - 1$$

The antenna spacings da are assumed to be multiples of $\lambda/2$, i.e. $d_n = m_n \lambda/2$, where $m_n$ is from a set of integers representing the virtual antenna locations, e.g. in our example of FIG. 4, we have $m_n \in \{0,1,4,6,13,14,17,19\}$. Substituting $d_n$ and $z_k$ in $\varphi_{k,n}$ results in:

$$\varphi_{k,n} = \frac{2\pi k m_n}{N_\theta}$$

Thus, it will be apparent to those skilled in the art that performing the correlation by DFT or FFT may be advantageous. In addition, the apparatus 100 may be configured to perform said zero-value entry insertion to extend the input data set (e.g. a snapshot) vector with zeros. We define a vector $\underline{\tilde{x}}$ of length $N_\theta$: $\underline{\tilde{x}} = (\tilde{x}_0, \ldots, \tilde{x}_{N_\theta-1})^T$ and we substitute $\tilde{x}_{m_n} = x_n$ for n=1 to N. At the other locations we substitute $\tilde{x}_m = 0$ (this is an example of the zero-insertion and zero-padding described above). Now the apparatus 100 may be configured to determine $Y_k$ by DFT as $$Y_k = \underline{a}_k^H \underline{x} = \sum_{m=0}^{N_\theta-1} \tilde{x}_m \exp\left(-j\frac{2\pi k m}{N_\theta}\right).$$

By choosing $N_\theta$ as a power of two, this correlation can be efficiently calculated using an FFT.

In one or more examples, the apparatus 100 is configured to, prior to said search for the set of directions of arrival angles, determine a second look up table, said second look up table providing an association between each of the candidate direction of arrival angles based on the discrete points of the search space for a plurality of targets, K, and $\alpha_{k,n}$, wherein $\alpha_{k,n} = (\underline{a}^H(\theta_k) \underline{a}(\theta_n))/N$ wherein $\underline{a}^H(\theta_k)$ comprises a Hermitian transpose of the vector $\underline{a}$ for a candidate direction of arrival angle $\theta_k$, $\underline{a}(\theta_n)$ comprises the vector for a different candidate direction of arrival angle $\theta_n$ for each target, wherein k and n represent indexes for stepping through the search space; and
- wherein said search comprises a step of retrieving $\alpha_{k,n}$ from the look up table for evaluating an objective function that contains the expression:

$$f = (A^H \underline{x})^H (A^H A)^{-1} (A^H \underline{x})$$

and wherein the term $(A^H A)^{-1}$ is determined based on $$\left(A^H A\right)^{-1} = \frac{1}{N(1-|\alpha_{k,n}|^2)} \begin{pmatrix} 1 & -\alpha_{k,n}^* \\ -\alpha_{k,n} & 1 \end{pmatrix}.$$

The above relates to a situation of searching for K=2 targets. In a search for K=3 targets, it will be appreciated a third index m will be involved and the apparatus will be configured to recall $\alpha_{k,n}$, $\alpha_{k,m}$ and $\alpha_{n,m}$ from a look up table.

In a search for K=3 targets, it will be appreciated that a third index m will be involved. The 3×3 matrix $A^H A$ is then given by:

$$A^H A = N \begin{pmatrix} 1 & \alpha_{k,n}^* & \alpha_{k,m}^* \\ \alpha_{k,n} & 1 & \alpha_{n,m}^* \\ \alpha_{k,m} & \alpha_{n,m} & 1 \end{pmatrix}.$$

Accordingly, the matrix $B = (A^H A)^{-1}$ can be computed and expressed in terms of $\alpha_{k,n}$, $\alpha_{k,m}$ and $\alpha_{m,n}$:

$$B = \frac{1}{N(1-|\alpha_{kn}|^2 - |\alpha_{m,n}|^2 - |\alpha_{k,m}|^2 + 2\operatorname{Re}\{\alpha_{k,n}^* \alpha_{k,m} \alpha_{n,m}^*\})} \cdot E$$

wherein $E = \begin{pmatrix} 1-|\alpha_{m,n}|^2 & -(\alpha_{k,n}^* - \alpha_{k,m}^* \alpha_{n,m}) & -(\alpha_{k,m}^* - \alpha_{k,n}^* \alpha_{n,m}^*) \\ -(\alpha_{k,n} - \alpha_{k,m} \alpha_{n,m}^*) & 1-|\alpha_{k,m}|^2 & -(\alpha_{n,m}^* - \alpha_{k,n} \alpha_{k,m}^*) \\ -(\alpha_{k,m} - \alpha_{k,n} \alpha_{n,m}) & -(\alpha_{n,m} - \alpha_{k,m}^* \alpha_{k,n}) & 1-|\alpha_{k,n}|^2 \end{pmatrix}$ The correlation of the antenna response x with the complex conjugate of K single target responses is given by:

$$A^H \underline{x} = (\underline{a}^H(\theta_k)\underline{x}, \underline{a}^H(\theta_n)\underline{x}, \underline{a}^H(\theta_m)\underline{x})^T = (Y_k, Y_n, Y_m)^T$$

In one or more examples, the apparatus 100 is configured to provide the second look up table based on the properties $\alpha_{k,n} = (\alpha_{n,k})^*$ and $\alpha_{k,k} = 1$, such that the second look up table size for $\alpha_{k,n}$ is $\frac{1}{2}N_\theta(N_\theta-1)$, wherein $N_\theta$ designates the number of discrete points in the search space.

In one or more examples, the apparatus 100 is configured to determine the values $\alpha_{k,n}$ of the second look-up table as a function of indices k and n, the function comprising k-n, and hence the second look up table for $\alpha_{k,n}$ will have size $N_\theta$ and that the mutual influence of 2 out of K targets can be captured in a coefficient that is function of the difference of their corresponding indices.

As mentioned above, Range-Doppler processing may or may not be performed to arrive at the input dataset. Accordingly, in one or more examples, the apparatus 101 includes a Range-Doppler processing module 113 configured to separate antenna data from the antenna elements 107-111, 301-308 into one or more datasets, at least one of the one or more datasets representative of one or more targets and each dataset, relative to others of the one or more datasets, being representative of one or both of:

different ranges from the antenna elements; and different radial velocities relative to the antenna elements; wherein the antenna data comprises radar signals received at the plurality of antenna elements that have reflected from the plurality of targets, and wherein the input dataset, $\underline{x}$, comprises one of said one or more datasets separated by the Range-Doppler processing module 113.

Figure 5:
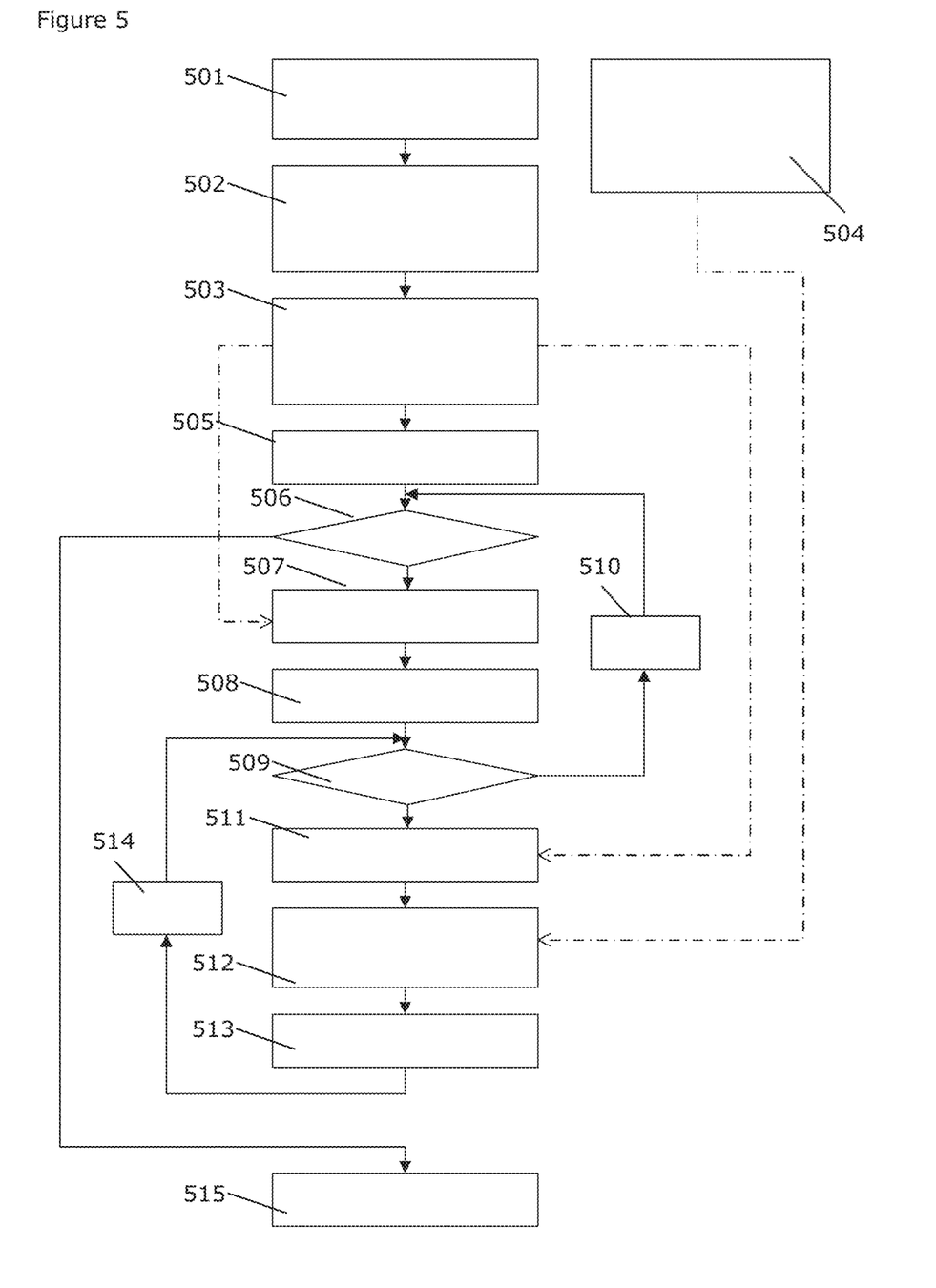
FIG. 5 shows an example flowchart illustrating a method.

Example FIG. 5 shows an example method. The method generally comprises the steps of receiving 501 an input dataset, $\underline{x}$, indicative of radar signals, $x_1, \ldots, x_N$, received at the plurality of antenna elements, N, wherein the radar signals have reflected from a plurality of targets, K;

defining 501 a matrix, A, formed of K vectors, $\underline{a}_n$, comprising one for each one of the plurality of targets, each beam-steering vector representing an expected response of the target represented by the beam-steering vector with a predetermined amplitude and comprising a function of the direction of arrival;

defining a signal amplitude vector $\underline{s}$ to represent expected complex amplitudes of each of the K targets as received in the radar signals;

defining an objective function based on $\underline{x}$, A and $\underline{s}$;

searching 505-514 for a set of directions of arrival angles for each of the targets K by the repeated evaluation of the objective function for a plurality of candidate beam-steering matrices A that each include different beam-steering vectors over a search space, wherein said set of directions of arrival are derived from one of the candidate beam-steering matrix of the plurality of candidate beam-steering matrices that provides a minimum evaluation of the objective function over the search space; and wherein said search space comprises a plurality of discrete points, z, associated with the direction of arrival angles by a function of $z=\sin(\theta_k)$, wherein $\theta_k$ represents the direction of arrival angle and wherein the distribution of the angle of arrival angles in the search space is non-uniform and, in this example, the distribution of the points z is uniform.

In particular, the method optionally comprises, at step 502, extending the number of entries in the input dataset, $\underline{x}$, to a predetermined number of entries. In particular, the input dataset may comprise a number of entries corresponding to the number of antenna elements. The input dataset may be represented as a column vector. The input dataset may have zero valued entries added to it to reach the predetermined number of entries. The arrangement of added zero valued entries to the original entries may represent the spacing of the antenna elements. FIG. 4 shows the antenna elements 301-308 with unlabelled squares therebetween representing where the zero-valued entries are positioned in the input dataset. The predetermined number of entries may comprise a power of two. Thus, each entry in the extended input dataset represents a spacing of $\lambda/2$ (or other predetermined fraction of a wavelength) and the data from the antenna elements is represented at a position in the extended dataset corresponding to the physical arrangement of the antenna elements.

The method optionally comprises, at step 503, performing a fast Fourier transform, FFT, on the extended input dataset to create a first look up table for $Y_k$.

The search using the objective function is initiated by setting an index value k to 1 at step 505. Thus, in this figure and the examples explained herein k comprises the index of the candidate DoA angle for a first target and n comprises the index of the candidate angle for the second target.

Steps 506 to 510 represent an inner loop in which the search space of $N_\theta$ direction of arrival angles is stepped through.

Step 506 comprises checking whether the index k is equal $N_\theta$ (which designates that all of the candidate direction of arrival angles of the discretized search space have been evaluated). If the condition is false, the method proceeds to step 507. If the condition is true, the method proceeds to step 515.

Step 507 comprises reading, for the current candidate direction of arrival angle, the values of $Y_k$ and $|Y_k|^2$ from the first look up table generated at step 503.

Step 508 comprises setting a second index value n to equal to index value k+1. The index value n is thus representing the candidate DoA angle of the second target.

Step 509 comprises checking whether index value n is equal to $N_\theta$, that is the number of discrete direction of arrival angles in the search space.

If the condition at step 509 is true, then the method proceeds to step 510 in which the index value k is incremented by one. The method returns to step 506. If the condition of step 509 is false, the method proceeds to step 511.

Step 504 shows the generation of the second look up table. The second look up table may be generated for $\alpha_{k,n}$ and, optionally, for $$\frac{1}{N(1-|\alpha_{k,n}|^2)}.$$

Step 511 comprises reading, for the current candidate direction of arrival angle, the values of $Y_n$ and $|Y_n|^2$ from the first and second look up tables generated at step 503.

Step 511 also comprises reading, for the current n, $\alpha_{k,n}$ and, optionally, $$\frac{1}{N(1-|\alpha_{k,n}|^2)}$$

from the second look up table.

Step 513 comprises the evaluation of the objective function based on the current value of k and n. The objective function comprises f(k, n, $\underline{x}$). Thus, f is a function of the input dataset (or "snapshot") $\underline{x}$ and of the candidate DoA angles being indexed with k and n.

The method proceeds to step 514 in which index n is incremented by one. The method returns to step 509.

Step 515 represents the completion of the search once the objective function for all of the candidate values of the search space has been evaluated. The values of $\theta_k$ (the direction of arrival angle for a first target, as defined by index k) and $\theta_n$ (the direction of arrival angle for a second target, as defined by index n) for which the objective function is maximized or minimized over the search space is thus determined.

Figure 6:
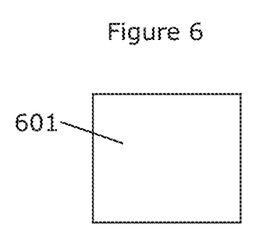
FIG. 6 shows an example computer readable medium.

FIG. 6 shows an example computer program product, such as a non-transitory computer program product, comprising computer program code which, when executed by the processor 102 of the apparatus 101 causes the apparatus 101 to perform the method described herein and as exemplified in FIG. 5.

The instructions and/or flowchart steps in the above figures can be executed in any order, unless a specific order is explicitly stated. Also, those skilled in the art will recognize that while one example set of instructions/method has been discussed, the material in this specification can be combined in a variety of ways to yield other examples as well, and are to be understood within a context provided by this detailed description.

In some example embodiments the set of instructions/method steps described above are implemented as functional and software instructions embodied as a set of executable instructions which are effected on a computer or machine which is programmed with and controlled by said executable instructions. Such instructions are loaded for execution on a processor (such as one or more CPUs). The term processor includes microprocessors, microcontrollers, processor modules or subsystems (including one or more microprocessors or microcontrollers), or other control or computing devices. A processor can refer to a single component or to plural components.

In other examples, the set of instructions/methods illustrated herein and data and instructions associated therewith are stored in respective storage devices, which are implemented as one or more non-transient machine or computer-readable or computer-usable storage media or mediums. Such computer-readable or computer usable storage medium or media is (are) considered to be part of an article (or article of manufacture). An article or article of manufacture can refer to any manufactured single component or multiple components. The non-transient machine or computer usable media or mediums as defined herein excludes signals, but such media or mediums may be capable of receiving and processing information from signals and/or other transient mediums.

Example embodiments of the material discussed in this specification can be implemented in whole or in part through network, computer, or data based devices and/or services. These may include cloud, internet, intranet, mobile, desktop, processor, look-up table, microcontroller, consumer equipment, infrastructure, or other enabling devices and services. As may be used herein and in the claims, the following non-exclusive definitions are provided.

In one example, one or more instructions or steps discussed herein are automated. The terms automated or automatically (and like variations thereof) mean controlled operation of an apparatus, system, and/or process using computers and/or mechanical/electrical devices without the necessity of human intervention, observation, effort and/or decision.

It will be appreciated that any components said to be coupled may be coupled or connected either directly or indirectly. In the case of indirect coupling, additional components may be located between the two components that are said to be coupled.

In this specification, example embodiments have been presented in terms of a selected set of details. However, a person of ordinary skill in the art would understand that many other example embodiments may be practiced which include a different selected set of these details. It is intended that the following claims cover all possible example embodiments.

What is claimed is:

1. A frequency-modulated-continuous-wave (FMCW) radar system comprising:
   a plurality of antenna elements configured to transmit and receive radar signals; and
   a processor configured to:
      receive an input dataset, $\underline{x}$, indicative of the radar signals received at the plurality of antenna elements, wherein the radar signals have reflected from a plurality of targets;
      define a matrix, A, formed of direction-of-arrival-angle vectors, $\underline{a}_n$, comprising one for each one of the plurality of targets, each direction-of-arrival-angle vector representing an expected response at the plurality of antenna elements of the radar signals from the target with a predetermined amplitude and comprising a function of a direction of arrival angle relative to the plurality of antenna elements;
      define a signal amplitude vector, $\underline{s}$, to represent expected complex amplitudes of each of the plurality of targets as received in the radar signals;
      define an objective function based on $\underline{x}$, A and $\underline{s}$;
      search for a set of the direction of arrival angles for each of the plurality of targets by the repeated evaluation of the objective function for a plurality of candidate matrices based on matrix A that each include different direction-of-arrival-angle vectors over a search space, wherein said set of direction of arrival angles are derived from one of the candidate matrices of the plurality of candidate matrices that provides one of a maximum and a minimum evaluation of the objective function over the search space; and
      wherein said search space comprises a plurality of discrete points associated with the direction of arrival angle by a function comprising $\sin(\theta_k)$, wherein $\theta_k$ represents the direction of arrival angle and wherein the distribution of the direction of arrival angles in the search space is non-uniform.

2. The radar system of claim 1, wherein the distribution of the plurality of discrete points in the search space is uniform.

3. The radar system of claim 1, wherein the apparatus is configured to, prior to said search for the set of direction of arrival angles, determine a first look up table, said first look up table providing an association between each of the plurality of discrete points of the search space and a function $Y_k$, wherein $Y_k = \underline{a}^H(\theta_k) \underline{x}$ and $\underline{a}^H(\theta_k)$ comprises a Hermitian transpose of the direction-of-arrival-angle vector, a, for a candidate direction of arrival angle $\theta_k$ having index k; and
   wherein said search comprises a step of retrieving $Y_k$ from the look up table for each of the targets being evaluated for evaluating the objective function, wherein the objective function contains the expression, f:

$$f = (A^H \underline{x})^H (A^H A)^{-1} (A^H \underline{x})$$

and $Y_k$ comprises part of the evaluation of the term $(A^H \underline{x})$ of said expression, f.

4. The radar system of claim 3, wherein the apparatus is configured to determine $Y_k$ by performing a correlation comprising calculating an inner product between direction-of-arrival-angle vector, $\underline{a}$, and the input dataset, $\underline{x}$, to obtain a complex value expression, wherein the first look up table comprises the evaluation of the complex value expression over the search space.

5. The radar system of claim 4, wherein the apparatus is configured to perform said correlation by Fourier transform.

6. The radar system of claim 5, wherein the number of entries in the input data set, $\underline{x}$, is increased to a predetermined number of entries by adding zero-valued entries, the zero-valued entries added at least at positions in the input dataset relative to the data that is indicative of the radar signals received at the plurality of antenna elements such that the data indicative of the radar signals have positions in the input dataset that correspond to a physical arrangement of the antenna elements and the zero-valued entries have positions in the input dataset that correspond to one or more gaps between the physical arrangement of the antenna elements and, thereby, the number of zero-valued entries between any two consecutive instances of the data indicative of the radar signals represents an inter-antenna element spacing.

7. The radar system of claim 1, wherein the number of discrete points in the search space comprises a power of two.

8. The radar system of claim 1, wherein the apparatus is configured to, prior to said search for the set of direction of arrival angles, determine a second look up table, said second look up table providing an evaluation of $\alpha_{k,n}=(\underline{a}^H(\theta_k) \underline{a}(\theta_n))/N$ wherein $\underline{a}^H(\theta_k)$ comprises a Hermitian transpose of the direction-of-arrival-angle vector for candidate direction of arrival angle $\theta_k$, and $\underline{a}(\theta_n)$ comprises the direction-of-arrival-angle vector for a candidate direction of arrival angle $\theta_n$, wherein k represents an index for each of the discrete points of the search space for a first target of the plurality of targets and n represents an index for each of the discrete points of the search space for a second target of the plurality of targets; and wherein said search comprises a step of retrieving $\alpha_{k,n}$ from the look up table for evaluating the objective function, wherein the objective function contains the expression, f:

$$f=(A^H\underline{x})^H(A^HA)^{-1}(A^H\underline{x})$$

and wherein the term $(A^HA)^{-1}$ is determined based on:

$$\left(A^H A\right)^{-1} = \frac{1}{N\left(1-|\alpha_{k,n}|^2\right)}\begin{pmatrix} 1 & -\alpha_{k,n}^* \\ -\alpha_{k,n} & 1 \end{pmatrix}.$$

9. The radar system of claim 8, wherein the apparatus is configured to determine the second look up table based on the properties $\alpha_{k,n}=(\alpha_{n,k})^*$ and $\alpha_{k,k}=1$, such that the second look up table size for $\alpha_{k,n}$ is $\frac{1}{2}N_\theta(N_\theta-1)$, wherein $N_\theta$ designates the number of discrete points in the search space.

10. The radar system of claim 8, wherein the apparatus is configured to determine the values $\alpha_{k,n}$ of the second look up table as a function of indices k and n, the function comprising k−n.

11. The radar system of claim 1, wherein the objective problem is based on Q, wherein $Q=|x-A\underline{s}|^2$.

12. The radar system of claim 1, wherein the number of the plurality of targets is between two and five.

13. The radar system of claim 1, wherein the apparatus includes a Range-Doppler processing module configured to separate antenna data into one or more datasets, each dataset representative of one or more targets and each dataset, relative to others of the one or more datasets, being representative of one or both of:
different ranges from the antenna elements; and
different radial velocities relative to the antenna elements; wherein
the antenna data comprises radar signals received at the plurality of antenna elements that have reflected from the plurality of targets, and wherein the input dataset, $\underline{x}$, comprises one of said one or more datasets separated by the Range-Doppler processing module.

14. A method for determining the directions of arrival angles for each of a plurality of targets K in radar signals comprising:
receiving, by way of a processor of a frequency-modulated-continuous-wave (FMCW) radar system, an input dataset, $\underline{x}$, indicative of radar signals received at a plurality of antenna elements wherein the radar signals have reflected from a plurality of targets;
defining, by way of the processor, a matrix, A, formed of direction-of-arrival-angle vectors, an, comprising one for each one of the plurality of targets, each direction-of-arrival-angle vector representing an expected response at the antenna elements of radar signals from the target with a predetermined amplitude and comprising a function of the direction of arrival angle relative to the plurality of antenna elements;
defining, by way of the processor, a signal amplitude vector $\underline{s}$ to represent expected complex amplitudes of each of the plurality of targets as received in the radar signals;
defining, by way of the processor, an objective function based on $\underline{x}$, A and $\underline{s}$;
searching, by way of the processor, for a set of directions of arrival angles for each of the plurality of targets by the repeated evaluation of the objective function for a plurality of candidate matrices based on matrix A that each include different direction-of-arrival-angle vectors over a search space, wherein said set of directions of arrival angles are derived from one of the candidate matrices of the plurality of candidate matrices that provides one of a maximum and minimum evaluation of the objective function over the search space; and
wherein said search space comprises a plurality of discrete points associated with the direction of arrival angles by a function comprising $\sin(\theta_k)$, wherein $\theta_k$ represents the direction of arrival angle and wherein the distribution of the direction of arrival angles in the search space is non-uniform.

15. The method of claim 14, wherein the distribution of the plurality of discrete points in the search space is uniform.

16. The method of claim 14, wherein prior to said searching for the set of direction of arrival angles, determining a first look up table, said first look up table providing an association between each of the plurality of discrete points of the search space and a function $Y_k$, wherein $Y_k=\underline{a}^H(\theta_k) \underline{x}$ and $a^H(\theta_k)$ comprises a Hermitian transpose of the direction-of-arrival-angle vector, a, for a candidate direction of arrival angle $\theta_k$ having index k.

17. The method of claim 16, further comprising determining $Y_k$ by performing a correlation comprising calculating an inner product between direction-of-arrival-angle vector, $\underline{a}$, and the input dataset, $\underline{x}$, to obtain a complex value expression, wherein the first look up table comprises the evaluation of the complex value expression over the search space.

18. The method of claim 14, wherein the number of the plurality of targets is greater than or equal to two and less than or equal to five.

19. The method of claim 14, wherein prior to said search for the set of direction of arrival angles, determining a second look up table, said second look up table providing an evaluation of $\alpha_{k,n}=(\underline{a}^H(\theta_k) \underline{a}(\theta_n))/N$ wherein $\underline{a}^H(\theta_k)$ comprises a Hermitian transpose of the direction-of-arrival-angle vector for candidate direction of arrival angle $\theta_k$, and $\underline{a}(\theta_n)$ comprises the direction-of-arrival-angle vector for a candidate direction of arrival angle $\theta_n$, wherein k represents an index for each of the discrete points of the search space for a first target of the plurality of targets and n represents an index for each of the discrete points of the search space for a second target of the plurality of targets.

* * * * *